(12) United States Patent
Kanayama et al.

(10) Patent No.: US 7,887,193 B2
(45) Date of Patent: Feb. 15, 2011

(54) ILLUMINATING DEVICE AND PROJECTION TYPE VIDEO DISPLAY APPARATUS

(75) Inventors: Hideyuki Kanayama, Uji (JP); Takashi Ikeda, Higashiosaka (JP); Haruhiko Murata, Ibaraki (JP)

(73) Assignee: Sanyo Electric Co., Ltd., Osaka (JP)

( * ) Notice: Subject to any disclaimer, the term of this patent is extended or adjusted under 35 U.S.C. 154(b) by 949 days.

(21) Appl. No.: 11/486,096

(22) Filed: Jul. 14, 2006

(65) Prior Publication Data

US 2007/0013872 A1 Jan. 18, 2007

(30) Foreign Application Priority Data

Jul. 15, 2005 (JP) ............... 2005-207498
Jun. 13, 2006 (JP) ............... 2006-162984

(51) Int. Cl.
*G03B 21/14* (2006.01)

(52) U.S. Cl. .......................... 353/38; 353/20

(58) Field of Classification Search ............ 353/30–31, 353/20, 38, 122; 359/495–497, 622, 627, 359/629; 362/19
See application file for complete search history.

(56) References Cited

U.S. PATENT DOCUMENTS

| | | | | |
|---|---|---|---|---|
| 4,484,100 | A * | 11/1984 | Sato | 313/44 |
| 6,067,193 | A * | 5/2000 | Sekine et al. | 359/489 |
| 6,084,714 | A | 7/2000 | Ushiyama et al. | |
| 6,208,451 | B1 * | 3/2001 | Itoh | 359/247 |
| 6,246,526 | B1 * | 6/2001 | Okuyama | 359/621 |
| 6,344,929 | B1 | 2/2002 | Sugawara | |
| 6,464,362 | B1 * | 10/2002 | Sugawara et al. | 353/102 |
| 6,497,488 | B1 * | 12/2002 | Yamauchi et al. | 353/38 |
| 6,517,212 | B2 * | 2/2003 | Satou | 353/99 |
| 6,796,654 | B2 * | 9/2004 | Huang | 353/20 |
| 7,390,094 | B2 * | 6/2008 | Berman et al. | 353/84 |
| 7,529,024 | B1 * | 5/2009 | Chen | 359/487 |
| 7,575,326 | B2 * | 8/2009 | Nishida et al. | 353/20 |
| 2003/0001519 | A1 | 1/2003 | Kirkpatrick et al. | |
| 2003/0152787 | A1 | 8/2003 | Arakawa et al. | |

(Continued)

FOREIGN PATENT DOCUMENTS

EP    1 326 123 A1    7/2003

(Continued)

OTHER PUBLICATIONS

Kevin E. Burcham et al., "Micromachined Silicon Cantilever Beam Accelerometer Incorporating an Integrated Optical Waveguide", SPIE vol. 1793 Integrated Optics and Microstructures (1992), XP-000700795, p. 12- p. 18.

*Primary Examiner*—Georgia Y Epps
*Assistant Examiner*—Jori S Reilly-Diakun
(74) *Attorney, Agent, or Firm*—NDQ&M Watchstone LLP

(57) ABSTRACT

An illuminating device includes a discharge lamp, a condenser lens, an integrator lens, a polarization conversion system, an electromagnetic wave shielding plate, and an electromagnetic wave shielding wall. A light given out from each lens in the light-incident-side fly's eye lens becomes two light fluxes via respective polarizing beam splitters and the two light fluxes pass through two lenses in the light-exit-side fly's eye lens. The electromagnetic shielding plate has an aperture on an optical axis of each lens in the light-exit-side fly's eye lens. The electromagnetic wave shielding plate is grounded through the electromagnetic wave shielding wall.

2 Claims, 9 Drawing Sheets

U.S. PATENT DOCUMENTS

| | | |
|---|---|---|
| 2003/0179977 A1 | 9/2003 | Li |
| 2004/0190149 A1* | 9/2004 | Lian et al. .................... 359/629 |
| 2004/0212893 A1 | 10/2004 | Okamura |
| 2004/0263697 A1 | 12/2004 | Fuse et al. |
| 2005/0248845 A1* | 11/2005 | Seo et al. .................... 359/487 |
| 2009/0207381 A1* | 8/2009 | Hirata et al. .................. 353/20 |

FOREIGN PATENT DOCUMENTS

| | | |
|---|---|---|
| JP | 2002116414 A * | 4/2002 |
| JP | 2002-343103 | 11/2002 |
| JP | 2002343103 | 11/2002 |
| JP | 2003-279880 A | 10/2003 |
| JP | 2003-302697 A | 10/2003 |
| WO | WO 94/11766 | 5/1994 |
| WO | WO 01/27962 A2 | 4/2001 |
| WO | WO 02/086848 A1 | 10/2002 |
| WO | WO 03/081321 A1 | 10/2003 |

* cited by examiner

ILLUMINATING DEVICE AND PROJECTION TYPE VIDEO DISPLAY APPARATUS

BACKGROUND OF THE INVENTION

Field of the Invention

The present invention relates to an illuminating device and a projection type display apparatus. In an illuminating device used in a liquid crystal projector and the like, there has been proposed a structure in which an electrodeless discharge lamp is used and an electromagnetic wave from the discharge lamp is shielded (See Japanese Patent Laying-open No. 2002-343103). An electromagnetic wave shielding is necessary for preventing an effect of the electromagnetic wave on an electronic circuit and a liquid crystal display panel and the like. In addition, as the electrodeless discharge lamp, the structure disclosed in WO 01/027962 is known. Furthermore, it is desirable for the illuminating device used in the liquid crystal projector to be provided with functions such as an optical integration function of reducing luminance non-uniformity and a function of converting polarization directions of light in a common direction.

SUMMARY OF THE INVENTION

An illuminating device using the above-described electrodeless discharge lamp and a projection type display apparatus using such the illuminating device are needed to shield electromagnetic wave, while being provided with an optical integration function of reducing luminance non-uniformity and a function of converting polarization directions of light in a common direction.

In view of the above circumstances, a purpose of the present invention is to provide an illuminating device and a projection type display apparatus using the same capable of shielding an electromagnetic wave, while being provided with an optical integration function of reducing luminance non-uniformity and a function of converting polarization directions of light in a common direction.

In order to solve the above-mentioned problem, an illuminating device according to the present invention comprises an electrodeless discharge lamp which generates an electromagnetic wave; an optical integrator, composed of a light-incident-side fly's eye lens and a light-exit-side fly's eye lens, for integrating light emitted from the discharge lamp and approximately collimated to guide to an object to be illuminated; and a polarization conversion system, composed of a polarizing beam splitter array, for converting polarization directions of the light emitted from the discharge lamp in a common direction; in which a lens arrangement pitch of the light-exit-side fly's eye lens is half of a lens arrangement pitch of the light-incident-side fly's eye lens, each light passing through each lens in the light-incident-side fly's eye lens is separated into two via each of the polarizing beam splitter to pass through two lenses in the light-exit-side fly's eye lens, a light reflection conductive body is arranged in a non-light-incident area of each of the polarizing beam splitter, and the light reflection conductive body is grounded (hereinafter referred to as a first configuration in this section).

With the above configuration, the illuminating device can shield the electromagnetic wave while being provided with the optical integration function of reducing luminance non-uniformity and the function of converting polarization directions of light in a common direction. In addition, the light reflection conductive body is provided, so that it is possible to prevent unnecessary light from entering in the polarization conversion system. This makes it possible to restrain a temperature rise in the polarization conversion system. That is, it is possible to obtain both of the functions of shielding the electromagnetic wave and of restraining the temperature rise in the polarization conversion system by the light reflection conductive body.

Furthermore, an illuminating device according to the present invention comprises an electrodeless discharge lamp which generates an electromagnetic wave; an optical integrator, composed of a light-incident-side fly's eye lens and a light-exit-side fly's eye lens, for integrating light emitted from the discharge lamp and approximately collimated to guide to an object to be illuminated; a polarization conversion system, composed of a polarizing beam splitter array, for converting polarization directions of the light emitted from the discharge lamp in a common direction; and a plate-like conductive body including a plurality of apertures; in which a lens arrangement pitch of the light-exit-side fly's eye lens is half of a lens arrangement pitch of the light-incident-side fly's eye lens; each light passing through each lens in the light-incident-side fly's eye lens is separated into two via each polarizing beam splitter to pass through two lenses in the light-exit-side fly's eye lens and the apertures of the conductive body; and the conductive body is grounded (hereinafter referred to as a second configuration in this section).

With the above configuration, the illuminating device can shield the electromagnetic wave while being provided with the optical integration function of reducing luminance non-uniformity and the function of converting polarization directions of light in a common direction.

In the second configuration, a second conductive body may be arranged in a non-light-incident area of each of the polarizing beam splitter, and the second conductive body may be grounded. This improves an electromagnetic wave shielding performance.

In the second configuration and a configuration according thereto, the light given out from each lens in the light-incident-side fly's eye lens, via each of the polarizing beam splitter, may pass through the two lenses in the light-exit-side fly's eye lens first and then pass through the apertures of the conductive body, or may pass through the apertures of the conductive body first and then pass through the two lenses in the light-exit-side fly's eye lens.

In the first or second configuration, or a configuration according to the second configuration, the light-incident-side fly's eye lens has a convex lens side positioned on the light incident side thereof, and is provided with a third conductive body in a non-light-passing area on a flat surface side which is a light exit side; and the third conductive body may be grounded. This improves the electromagnetic wave shielding performance.

Furthermore, an illuminating device according to the present invention comprises an electrodeless discharge lamp which generates an electromagnetic wave; an optical integrator, having a hollow or non-hollow rod-like body, for integrating light emitted from the discharge lamp to guide to an object to be illuminated; and a wire-grid polarizer, provided on a light exit surface side of the optical integrator, for transmitting a polarized light having a specific polarization direction and reflecting a polarized light having another polarization direction; and the wires of the wire-grid polarizer are grounded (hereinafter referred to as a third configuration in this section). In the third configuration, the wire-grid polarizer further includes a plurality of wires in a direction perpendicular to or approximately perpendicular to a wire direction thereof, and the wires of the wire-grid polarizer may also be grounded. Or, in the third configuration, a member is provided so as to face the wire-grid polarizer, the member includes a plurality of wires in a direction perpendicular to or approximately perpendicular to the wire direction of the wire-grid polarizer, and the wires of the member may be grounded.

Furthermore, an illuminating device according to the present invention comprises an electrodeless discharge lamp which generates an electromagnetic wave; an optical integrator, having a hollow or non-hollow rod-like body, for integrating light emitted from the discharge lamp to guide to an object to be illuminated; a first wire-grid polarizer, provided on a light exit surface side of the optical integrator, for transmitting a polarized light having a specific polarization direction and for reflecting a polarized light having another polarization direction; a second wire-grid polarizer provided so as to face the first wire-grid polarizer; and a retardation plate for rotating a polarization direction of light by 90 degrees or approximately 90 degrees; in which the retardation plate is arranged between the two wire-grid polarizers, the two wire-grid polarizers are arranged such that the wire directions thereof are perpendicular to or approximately perpendicular to each other, and the wires of the two wire-grid polarizers are grounded (hereinafter referred to as a fourth configuration in this section).

With the third and fourth configurations, the illuminating device can shield the electromagnetic wave, while being provided with the optical integration function of reducing luminance non-uniformity and the function of converting polarization directions of light in a common direction.

In the third or fourth configurations, or a configuration according to these configurations, a side surface of the optical integrator is covered with a conductive body, and the conductive body may be grounded. This improves the electromagnetic wave shielding performance.

In the third or fourth configuration, or a configuration according to these configurations, a conductive mirror is arranged at a portion on the light incident surface side of the optical integrator where light from the discharge lamp is not prevented from entering, a retardation plate for rotating a polarization direction of light is arranged between the conductive mirror and the light incident surface of the optical integrator, and the conductive mirror may be grounded. This improves the electromagnetic wave shielding performance.

Furthermore, an illuminating device according to the present invention comprises in an electromagnetic wave shielding case: an electrodeless discharge lamp which generates an electromagnetic wave; an optical integrator for integrating light emitted from the discharge lamp to guide to an object to be illuminated; and a polarization conversion system for converting polarization directions of the light emitted from the discharge lamp in a common direction; in which a wire-grid polarizer for transmitting a polarized light having a specific polarization direction and for reflecting a polarized light having another polarization direction is arranged on an aperture for light passage formed on the electromagnetic wave shielding case, and the wires of the wire-grid polarizers and the electromagnetic wave shielding case are grounded (hereinafter referred to as a fifth configuration in this section).

In the fifth configuration, the optical integrator may be composed of a pair of fly's eye lenses or may have a hollow or non-hollow rod-like body.

The polarization directions of the light are converted in the common direction by the polarization conversion system. However, when the polarization directions are not completely converted in the common direction, the object to be illuminated is damaged due to heat. In the fifth configuration and a configuration according thereto, it is possible to sufficiently eliminate unnecessary polarized light by the wire-grid polarizer. Accordingly, it is possible to prevent the damage due to heat and to shield the electromagnetic wave at the same time.

Furthermore, an illuminating device according to the present invention comprises in an electromagnetic wave shielding case: an electrodeless discharge lamp which generates an electromagnetic wave; an optical integrator for integrating light emitted from the discharge lamp to guide to an object to be illuminated; and a polarization conversion system for converting polarization directions of the light emitted from the discharge lamp in a common direction; in which a first wire-grid polarizer for transmitting a polarized light having a specific polarization direction and for reflecting a polarized light having another polarization direction, a second wire-grid polarizer provided so as to face the first wire-grid polarizer, and a retardation plate for rotating a polarization direction of light by 90 degrees or approximately 90 degrees are provided on an aperture for light passage formed on the electromagnetic wave shielding case; the retardation plate is arranged between the two wire-grid polarizers, the two wire-grid polarizers are arranged such that the wire directions thereof are perpendicular to or approximately perpendicular to each other, and the wires of the two wire-grid polarizers and the electromagnetic wave shielding case are grounded (hereinafter referred to as a sixth configuration in this section).

In the sixth configuration, the optical integrator may be composed of a pair of fly's eye lenses or may have a hollow or non-hollow rod-like body.

Furthermore, a projection type display apparatus according to the present invention comprises one or a plurality of light valves for modulating light emitted from an illuminating device, and the projection type display apparatus includes an illuminating device according to any one of above-described illuminating devices as the illuminating device.

According to the present invention, in the configuration in which the discharge lamp which generates the electromagnetic wave is used, there are advantages such that the illuminating device and the projection type display apparatus can shield the electromagnetic wave, while being provided with an optical integration function of reducing luminance non-uniformity and a function of unifying polarization directions of light.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter, an illuminating device and a projection type display apparatus according to an embodiment of the present invention will be described with reference to FIG. 1 through FIG. 14.

Figure 1:
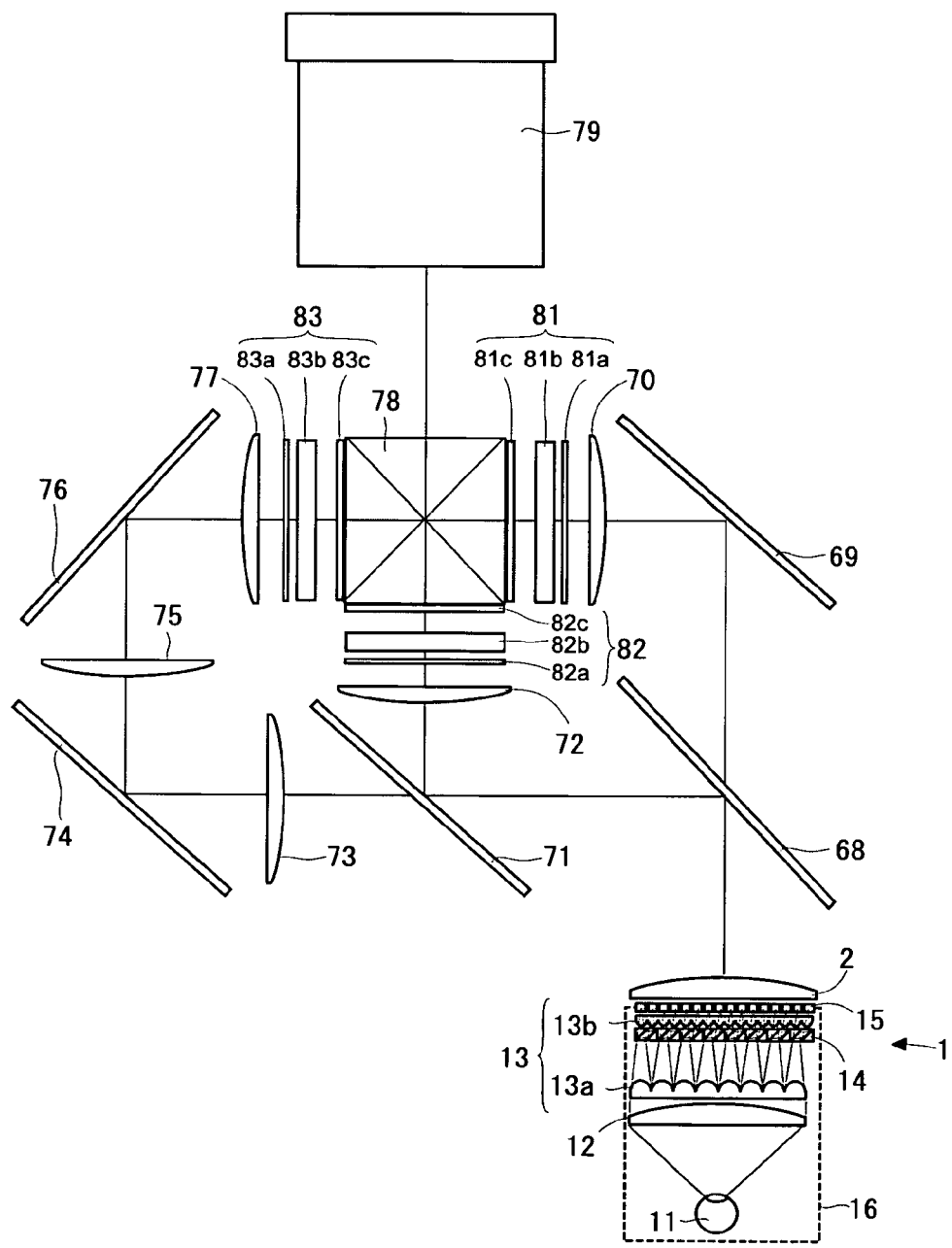
FIG. 1 is a descriptive diagram showing an illuminating device and an optical system of an projection type display apparatus according to an embodiment of the present invention.

FIG. 1 is a descriptive diagram showing a three-panel projection type display apparatus provided with an illuminating device 1 according to the present invention. White light emitted from the illuminating device 1 is guided to a first dichroic mirror 68. The first dichroic mirror 68 transmits light in a red wavelength band and reflects light in a cyan (green+blue) wavelength band. The light in the red wavelength band which has passed through the first dichroic mirror 68 is reflected by a reflection mirror 69 so that its optical path is changed. The light in the red wavelength band reflected by the reflection mirror 69 is guided to a transmissive liquid crystal display panel for red light 81 via a condenser lens 70, and is optically modulated by passing through the liquid crystal display panel. On the other hand, the light in the cyan wavelength band reflected by the first dichroic mirror 68 is guided to a second dichroic mirror 71.

The second dichroic mirror 71 transmits light in a blue wavelength band and reflects light in a green wavelength band. The light in the green wavelength band reflected by the second dichroic mirror 71 is guided to a transmissive liquid crystal display panel for green light 82 via a condenser lens 72, and is optically modulated by passing through the liquid crystal display panel. Furthermore, the light in the blue wavelength band which has passed through the second dichroic mirror 71 is guided to a transmissive liquid crystal display panel for blue light 83 via reflection mirrors 74, 76, relay lenses 73, 75, and a condenser lens 77, and is optically modulated by passing through the liquid crystal display panel.

The respective liquid crystal display panels 81, 82, 83 are formed of being provided with incident-side polarizers 81a, 82a, 83a, panel portions 81b, 82b, 83b each formed by sealing a liquid crystal between a pair of glass plates (in which a pixel electrode and an alignment film are formed), and exit-side polarizers 81c, 82c, 83c. The modulated lights (image light in respective colors) obtained by passing respectively through the liquid crystal panels 81, 82, and 83 are combined by a cross dichroic prism 78 to be a full color image light. The full color image light is projected by a projection lens 79, and displayed on a screen.

Figure 2:
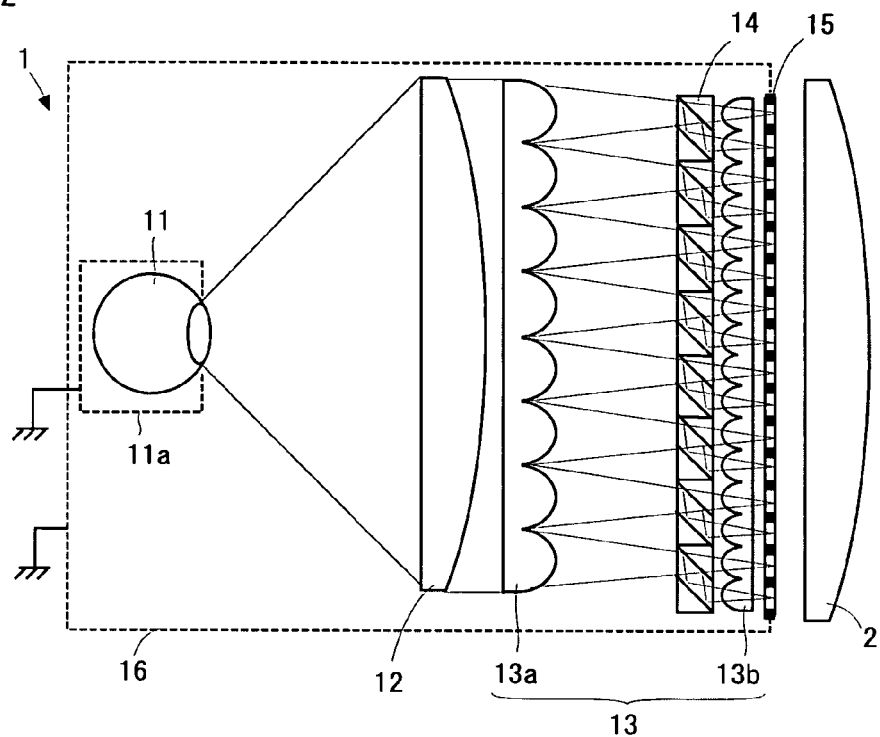
FIG. 2 is an enlarged view of the illuminating device shown in FIG. 1.

The illuminating device 1, as shown in FIG. 2, includes a discharge lamp 11, a condenser lens 12, integrator lens 13, a polarization conversion system 14, an electromagnetic wave shielding plate 15, and an electromagnetic wave shielding wall 16.

The discharge lamp 11 has an electrodeless structure, and emits light from a lamp aperture, as a result of discharge phenomena generated by excitation of materials in the lamp by applying an electromagnetic wave such as a microwave and the like. Such the discharge lamp 11 may have a structure disclosed in published Japanese translation of PCT international publication for patent applications 2003-523527, for example. In addition, it is desirable that the lamp aperture is square in shape and the aspect ratio of the aperture is equal to that of an object to be illuminated. However, this is not always the case. Moreover, in this embodiment, the discharge lamp 11 itself is covered with a metal mesh 11a and the metal mesh 11a is grounded (earthed).

The condenser lens 12 receives the light emitted from the lamp aperture of the discharge lamp 11 and approximately collimates the light.

The integrator lens 13 is composed of a light-incident-side fly's eye lens 13a and light-exit-side fly's eye lens 13b, and each lens pair guides the light emitted from the lamp aperture of the discharge lamp 11 to the entire surfaces of the liquid crystal display panels 81, 82, and 83. Accordingly, luminance uniformity can be obtained in light fluxes guided to the liquid crystal display panels 81, 82, and 83, even if luminance non-uniformity exists in the light emitted from the lamp aperture of the discharge lamp 11. It should be noted that a lens arrangement pitch (pitch in the light separation direction by polarization) of the light-exit-side fly's eye lens 13b is half of a lens arrangement pitch of the light-incident-side fly's eye lens 13a.

Figure 3:
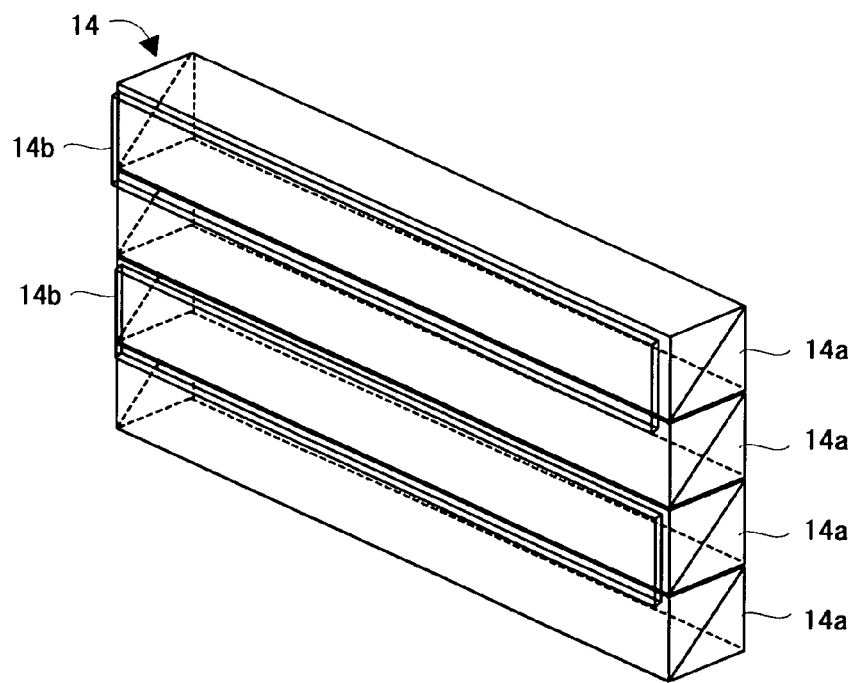
FIG. 3 is a perspective view showing a polarization conversion system.

The polarization conversion system 14 is arranged on the light incident side of the light-exit-side fly's eye lens 13b. The basic unit of the polarization conversion system 14 includes, as shown in FIG. 3, two polarizing beam splitters (PBS) 14a, 14a and a retardation plate (½ λ plate) 14b arranged on the light exit side of one of the two polarizing beam splitters 14a. A polarized light separating surface of each polarizing beam splitter 14a transmits a P-polarized light and changes an optical path of a S-polarized light by 90 degrees. The S-polarized light having the optical path changed is reflected by an adjacent polarized light separating surface and given out as it is. On the other hand, the P-polarized light that passes through the polarized light separating surface is converted into the S-polarized light by the retardation plate 14b provided on the front side (light-exit side) of the polarizing beam splitter, and given out. That is, in this example, approximately all the lights are converted into the S-polarized light.

The light given out from each lens in the light-incident-side fly's eye lens 13a becomes two light fluxes by passing through each polarizing beam splitters 14a and the two light fluxes pass through two lenses in the light-exit-side fly's eye lens 13b. The light passes through each lens reaches the relay lens 2.

The electromagnetic wave shielding plate 15 is arranged on the light exit side of the light-exit-side fly's eye lens 13b. The electromagnetic wave shielding plate 15 has an aperture in square, round, or other shape, on an optical axis of each lens in the light-exit-side fly's eye lens 13b. The aperture is formed as small as possible but not to prevent passage of light. The electromagnetic wave shielding plate 15 is, for example, constructed by forming the apertures on a metal plate by press machining or the like. The electromagnetic wave shielding plate 15 is so provided as to electrically contact with the electromagnetic wave shielding wall 16. The electromagnetic wave shielding wall 16 is, for example, constructed by forming a case with metal mesh. The electromagnetic wave shielding wall 16 is grounded (earthed), so that the electromagnetic wave shielding plate 15 is also grounded. In addition, the electromagnetic wave shielding plate 15 may be attached on the light-exit-side surface of the light-exit-side fly's eye lens 13b, or may be formed like a film or foil on the light-exit-side surface of the light-exit-side fly's eye lens 13b. Moreover, the above-mentioned ground (earth) may have a structure preferable for an alternating current or a high frequency wave. Much the same is true on the ground (earth) in another configuration example described later.

In the above-described configuration, the optical system provided with the integrator lens 13 having an optical integration function and the polarization conversion system 14 for converting polarization directions of light in a common direction includes also the electromagnetic wave shielding plate 15. That is, in the illuminating device using the discharge lamp 11, optical integration, redirection of polarization directions in the common direction, and electromagnetic wave shielding are realized.

Figure 4:
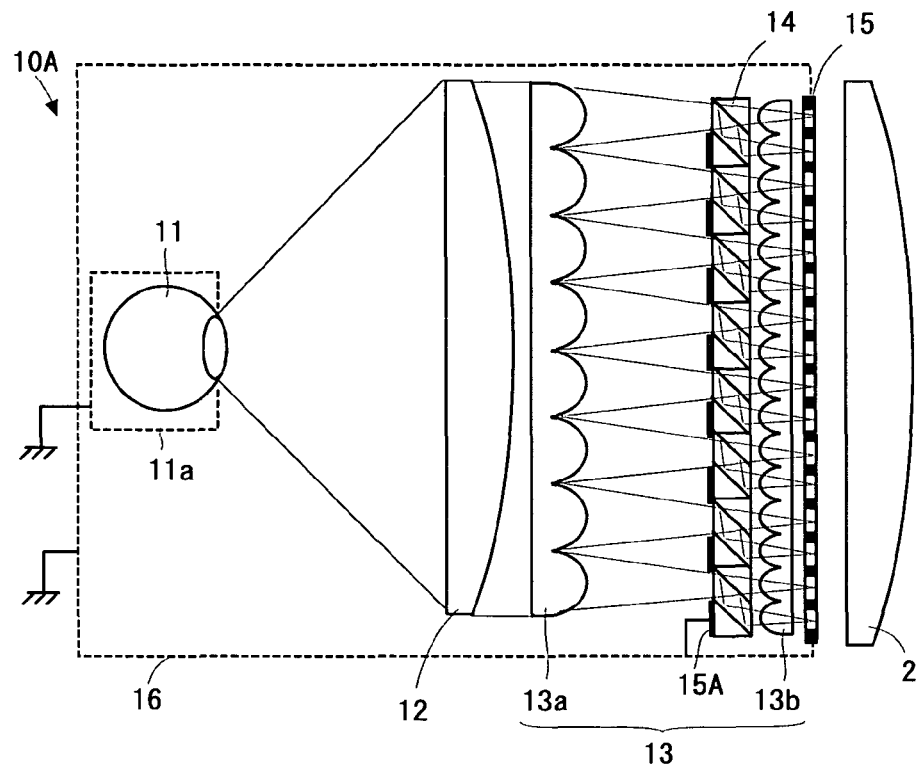
FIG. 4 is a descriptive diagram showing another configuration example of an illuminating device of the present invention.

FIG. 4 shows an illuminating device 10A having another configuration example. The illuminating device 10A has a configuration in which the illuminating device 1 shown in FIG. 3 is provided with a second electromagnetic wave shielding plate 15A on the light incident side of the polarization conversion system 14. The second electromagnetic wave shielding plate 15A can be formed with conductive film (for example, metal film can be adopted, and transparent conductive film without a light reflection function or opaque conductive film can also be adopted) formed in a non-light-incident area of the polarization conversion system 14, and each conductive film (or, a common conductive film electrically connected with each of the conductive film) is grounded. In this embodiment, the conductive film is electrically connected with the electromagnetic wave shielding wall 16. In addition, the second electromagnetic wave shielding plate 15A may be formed as a plate-like member, instead of being formed directly on the polarization conversion system 14. Then, the second electromagnetic wave shielding plate 15A, which is a plate-like member, may be provided on the light incident side of the polarization conversion system 14.

In the above-described illuminating device 10A, the conductive film of the second electromagnetic wave shielding plate 15A is positioned on the central axes on the apertures (alternation) of the electromagnetic wave shielding plate 15. That is, the number of apertures of the electromagnetic wave shielding plate 15 is substantially decreased by adding the second electromagnetic wave shielding plate 15A, this leads to an improvement of electromagnetic wave shielding performance. It should be noted that the second electromagnetic wave shielding plate 15A can be formed in a lattice (reticular) shape, instead of being formed in a striped shape. The lattice-shape (reticular-shape) shielding plate can improve the electromagnetic wave shielding performance more greatly.

In the above-described illuminating device 10A, a structure in which the electromagnetic wave shielding plate 15 is omitted can be adopted. In this case, as the conductive film of the second electromagnetic wave shielding plate 15A, conductive film with a light reflection function (for example, metal film) is used. It is preferable that an aperture for light passage of the electromagnetic wave shielding wall 16 is so positioned as to be close to an edge-side surface of the polarization conversion system 14. With such a configuration, the conductive film having the light reflection function can prevent unnecessary light from entering into the polarization conversion system 14, and it is possible to restrain temperature rise in the polarization conversion system 14. That is, it is possible to obtain both functions of shielding electromagnetic wave and restraining temperature rise in the polarization conversion system by providing the conductive film. Needless to say, the same advantage as above can be obtained in a case where the second electromagnetic wave shielding plate 15A is provided with the conductive film having the light reflection function in the illuminating device 10A.

Figure 5:
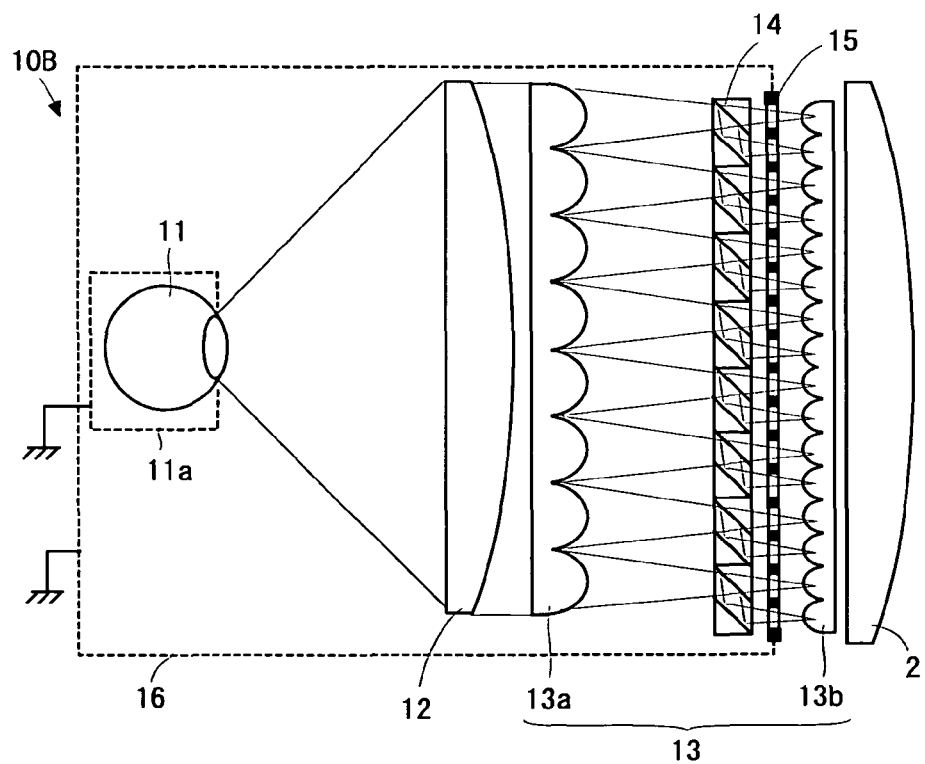
FIG. 5 is a descriptive diagram showing another configuration example of an illuminating device of the present invention.

FIG. 5 shows an illuminating device 10B with another configuration example. The illuminating device 1 shown in FIG. 2 is provided with the electromagnetic wave shielding plate 15 on the light exit side of the light-exit-side fly's eye lens 13b. On the other hand, the illuminating device 10B is provided with the electromagnetic wave shielding plate 15 on the light incident side of the light-exit-side fly's eye lens 13b. In addition, the second electromagnetic wave shielding plate 15A can be added to the illuminating device 10B same as in the case of the illuminating device 10A.

Figure 6:
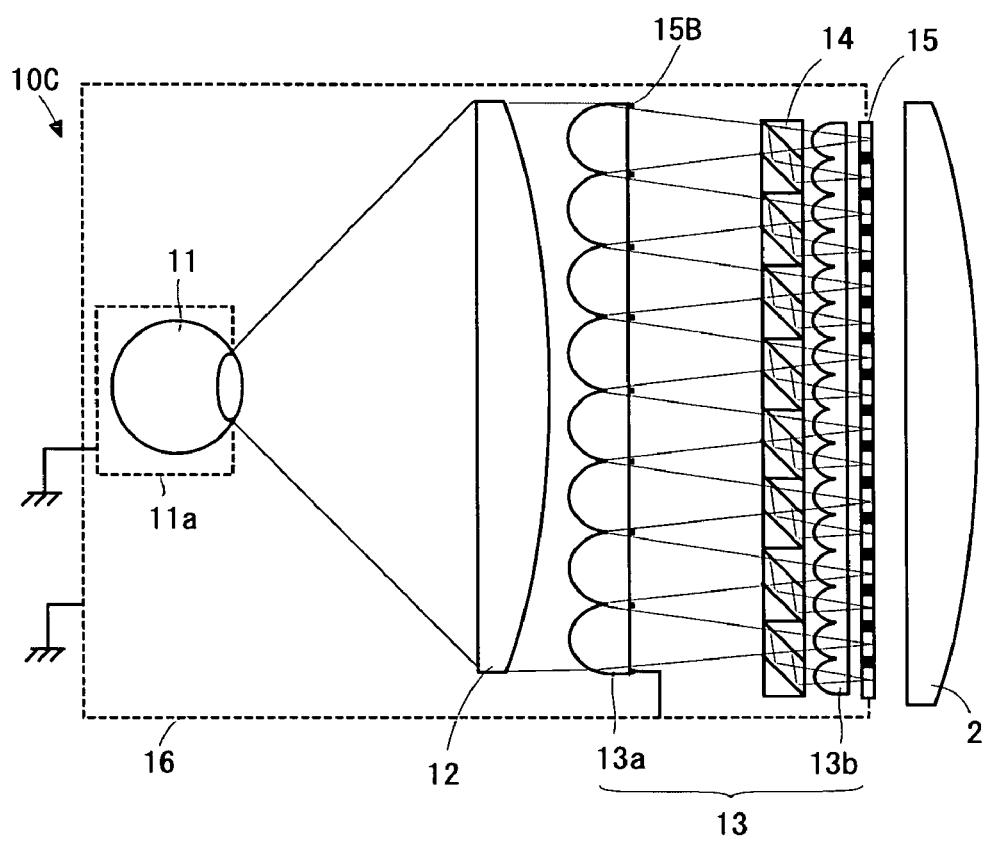
FIG. 6 is a descriptive diagram showing another configuration example of an illuminating device of the present invention.

FIG. 6 shows an illuminating device 10C with another configuration example. The illuminating device 1 shown in FIG. 2 includes the light-incident-side fly's eye lens 13a arranged such that its convex lenses face the light exit side. On the other hand, the illuminating device 10C includes the light-incident-side fly's eye lens 13a arranged such that its convex lenses face the light incident side. In addition, a third electromagnetic wave shielding plate 15B is added on the non-light-passing area on the flat surface side which is the light exit side of the light-incident-side fly's eye lens 13a. The third electromagnetic wave shielding plate 15B is formed with the conductive film (for example, metal film) formed in the non-light-passing area, and the film is in a lattice (reticular) shape corresponding to the edge of each lens. In addition, the third electromagnetic wave shielding plate 15B is grounded by electrically connected to the electromagnetic wave shielding wall 16 in this embodiment.

It should be noted that the third electromagnetic wave shielding plate 15B may be formed as a plate-like member, instead of being formed directly on the above-described flat surface, and the third electromagnetic wave shielding plate 15B as the plate-like member may be arranged on the flat surface side. In addition, the second electromagnetic wave shielding plate 15A can be added to the illuminating device 10C same as in the case of the illuminating device 10A. Or, it is possible to adopt a configuration in which the second electromagnetic wave shielding plate 15A is added, and on the other hand, the electromagnetic wave shielding plate 15 is omitted. Furthermore, the illuminating device 10C may be provided with the electromagnetic wave shielding plate 15 on the light incident side of the light-exit-side fly's eye lens 13b same as in the case of the illuminating device 10B.

Figure 7:
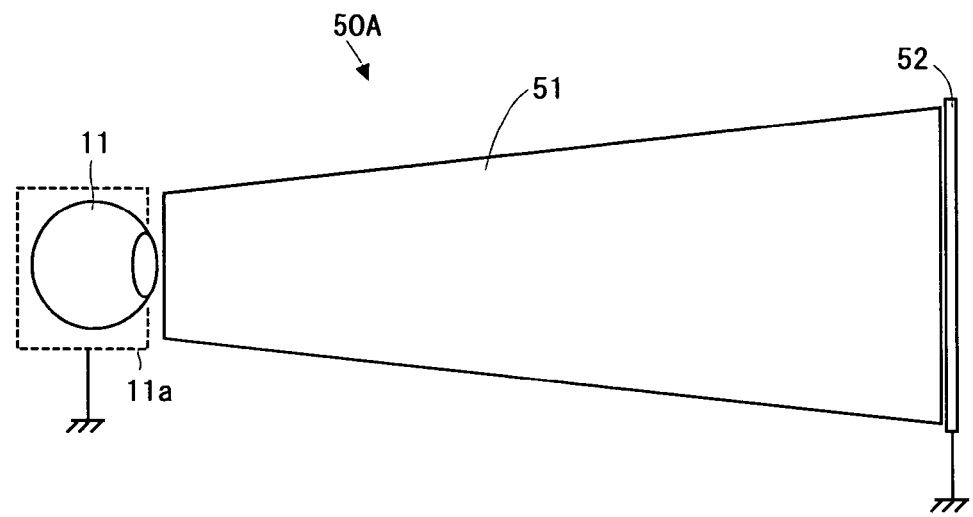
FIG. 7 is a descriptive diagram showing another configuration example of an illuminating device of the present invention.

FIG. 7 shows an illuminating device 50A with another configuration example. The illuminating device 50A is provided with a rod integrator 51 as an optical integrator. In this example, the rod integrator 51 has a tapered shape (shape in which the apex of square pyramid is cut off) and has a light exit surface larger than its light incident surface. Needless to say, the shape of the rod integrator is not limited to such a shape, and may have a non-tapered shape (square pole shape, etc.), for example. In addition, though the shapes of the light incident surface and the light exit surface are not limited to the square shape, it is desirable that at least the light exit surface is square in shape if the object to be illuminated has a square shape. Furthermore, it is desirable that the aspect ratio of the light exit surface is equal to or approximately equal to that of the object to be illuminated. Moreover, the rod integrator 51 may have hollow shape (inner surface is mirror) or non-hollow shape (transparent glass, etc.)

The lamp aperture of the discharge lamp 11 faces the light incident surface of the rod integrator 51, and the light emitted from the lamp aperture is given out from the light exit surface with the luminance non-uniformity being reduced by passing through the rod integrator 51. In addition, due to the above-described tapered shape, a divergeng angle of light can be rendered small.

Figure 8:
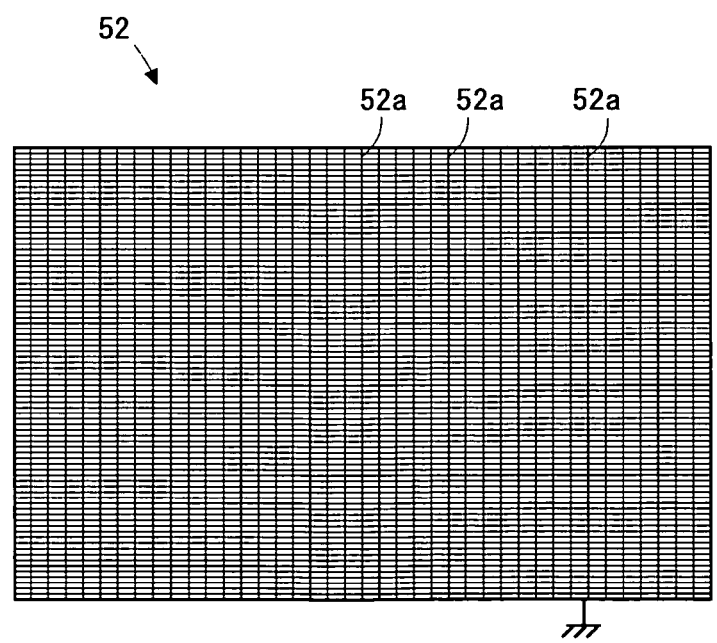
FIG. 8 is a descriptive diagram showing another configuration example of an illuminating device of the present invention.

A reflective wire-grid polarizer 52 is provided on the light exit surface side of the rod integrator 51. The wire-grid polarizer 52 is formed by arranging wires (metal wires) on a transparent substrate in an array shape in fine pitch (na-noorder), and transmits a polarized light having a specific polarization direction (for example, P-polarized light) and reflects a polarized light having another polarization direction (for example, S-polarized light). Furthermore, as shown in FIG. 8, the wire-grid polarizer 52 includes also a plurality of wires 52a, in addition to the original wires, in a direction perpendicular to the original wires at an interval suitable for absorbing (shielding) the electromagnetic wave (millimeter-order, for example). Moreover, the wires 52a of the wire-grid polarizer 52 are grounded.

In the above-described illuminating device 50A, even if the electromagnetic wave is to be radiated from the light exit surface of the rod integrator 51, the wire-grid polarizer can prevent the emission of the electromagnetic wave sufficiently, because the wire-grid polarizer 52 is positioned on the light exit surface side of the rod integrator and the wire-grid polarizer 52 has, in addition to the original wires, the wires 52a arranged perpendicularly to the original wires. That is, in the illuminating device using the discharge lamp 11, all the functions of integrating emission light, unifying polarization directions of light, and shielding the electromagnetic wave are realized.

In addition, a normal wire-grid polarizer without the wires 52a can be used, though the electromagnetic wave shielding performance may be a little inferior to the above-described polarizer. Furthermore, the normal wire-grid polarizer and a member having the wires 52a on a transparent substrate are so arranged as to face each other. The wires 52a of the member are grounded.

Figure 9:
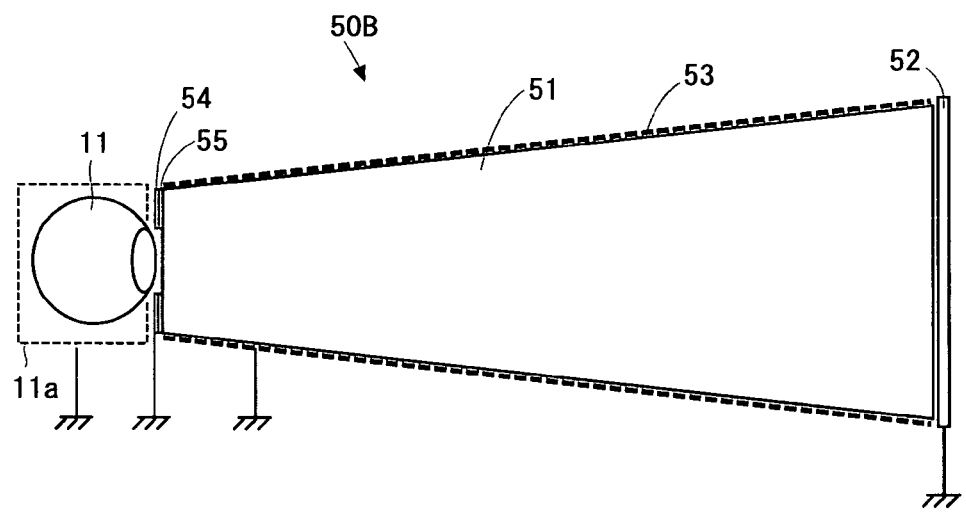
FIG. 9 is a descriptive diagram showing another configuration example of an illuminating device of the present invention.

FIG. 9 shows an illuminating device 50B with another configuration example. The illuminating device 50B has a structure in which the illuminating device 50A shown in FIG. 8 includes the rod integrator 51 of which side surfaces are covered with a conductive body (for example, metal film or metal mesh, etc.) 53, and the conductive body 53 is grounded. In addition, it is desirable that the metal film which is excellent in light reflection function, or the like is used as the conductive body 53.

Furthermore, a conductive mirror 54 is arranged at a portion on the light incident surface side of the rod integrator 51 where the light from the discharge lamp is not prevented from entering. In addition, a retardation plate (¼ λ plate) 55 for rotating the polarization direction of light is arranged between the conductive mirror 54 and the light incident surface of the rod integrator 51. Moreover, the conductive mirror 54 is grounded.

The above-described illuminating device 50B can shield the electromagnetic wave leaked from the side surface and a part of the light incident surface of the rod integrator 51. Furthermore, the illuminating device is provided not only with the conductive mirror 54, but also with the retardation plate 55 between the conductive mirror 54 and the light incident surface of the rod integrator 51, so that the polarized light reflected by the wire-grid polarizer 52 becomes the polarized light having the specific polarization direction by reciprocating in the retardation plate 55, then the polarized light can pass through the wire-grid polarizer 52. As a result, an amount of the emission light can be increased.

Figure 10:
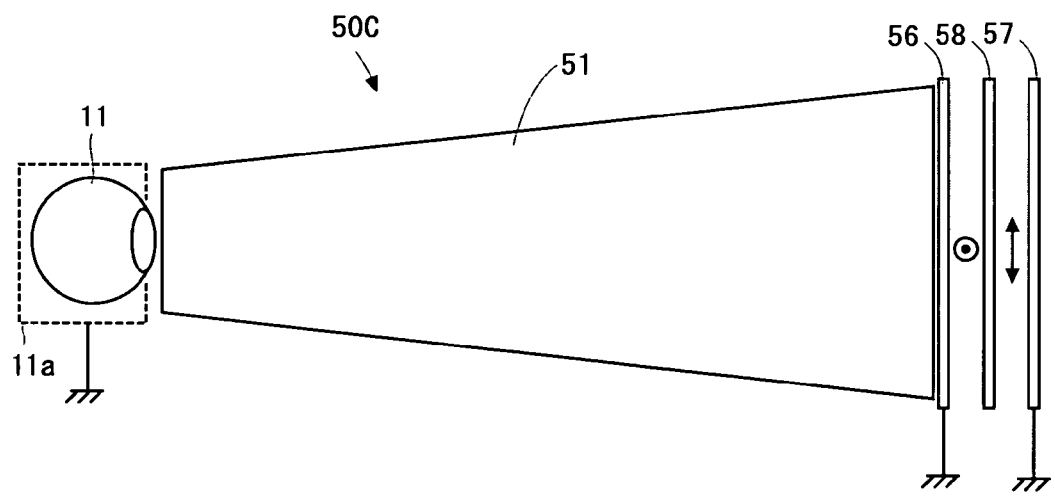
FIG. 10 is a descriptive diagram showing another configuration example of an illuminating device of the present invention.

FIG. 10 shows an illuminating device 50C with another configuration example. The illuminating device 50C is provided with, instead of the wire-grid polarizer 52 in the illuminating 50A shown in FIG. 7, two wire-grid polarizers 56, 57, and a retardation plate (½λ plate) 58 for rotating the polarization direction of light by 90 degrees or approximately 90 degrees. The wire-grid polarizers 56, 57 are the normal wire-grid polarizer without the above-described wires 52a . . . , but the polarizers are arranged such that the wire directions thereof are perpendicular to or almost perpendicular to each other. In addition, the retardation plate 58 is provided between the wire-grid polarizers 56, 57, so that the retardation plate rotates the polarization direction of the light passing through the wire-grid polarizer 56 by 90 degrees and guides the light to the wire-grid polarizer 57. Accordingly, the polarized light can pass through the wire-grid polarizer 57. In addition, though the wire-grid polarizers 56, 57 are spaced apart from each other in FIG. 10, the polarizers may be arranged close to each other with sandwiching the retardation plate 58.

In the above-described illuminating device 50C, even if the electromagnetic wave is to be radiated from the light exit surface of the rod integrator 51, the emission of the electromagnetic wave can be prevented sufficiently because the wire-grid polarizers 56, 57 of which wire directions are perpendicular to or approximately perpendicular to each other are arranged on the light exit surface side of the rod integrator.

In addition, the illuminating device 50C also can adopt the structure in which the conductive body 53 in the illuminating device 50B is added, or the structure in which the conductive mirror 54 and the retardation plate 55 are added, or the structure in which all of the above are added. Furthermore, in the configuration in which the above-described two wire-grid polarizers 56, 57 are provided, the wire-grid polarizer 56 may be provided on the light incident surface side of the rod integrator 51.

Figure 11:
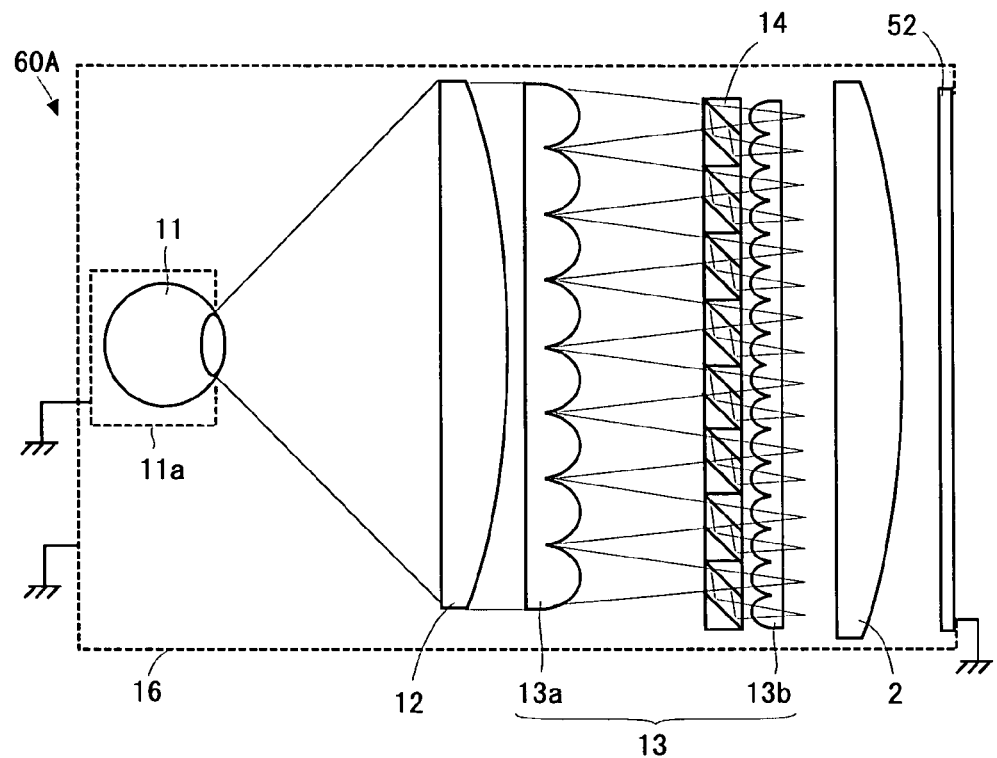
FIG. 11 is a descriptive diagram showing another configuration example of an illuminating device of the present invention.

FIG. 11 shows an illuminating device 60A with another configuration example. The illuminating device 60A has a configuration similar to that of the illuminating device 1 shown in FIG. 2. Out of the components in the illuminating device 60A, the components common with that in the illuminating device 1 are referred to by the same numerals and descriptions thereof are omitted. The illuminating device 60A is provided with the wire-grid polarizer 52 on the aperture for light passage of the electromagnetic wave shielding wall 16. The wire-grid polarizer 52 is grounded.

The polarization conversion system 14 converts the polarization directions of light in the common direction. However, when the polarization directions are not converted completely in the common direction, the objects to be illuminated (liquid crystal display panels 81, 82, 83) are damaged due to heat. The illuminating device 60A is provided with the wire-grid polarizer 52, so that it is possible to prevent the damage due to heat and to shield the electromagnetic wave at the same time.

The aperture for light passage of the electromagnetic wave shielding wall 16 may be positioned on the near side of the relay lens 2 (light exit side of the fly's eye lens 13b), and the wire-grid polarizer 52 may be arranged on this aperture for light passage. Such a configuration is equal to the configuration in which the wire-grid polarizer 52 is arranged instead of the electromagnetic wave shielding plate 15 in the illuminating device 1 shown in FIG. 2.

Furthermore, the aperture for light passage of the electromagnetic wave shielding wall 16 may be positioned on the near side of the fly's eye lens 13b (light exit side of the polarization conversion system 14), and the wire-grid polarizer 52 may be arranged on this aperture for light passage. With such a configuration, it is possible to reduce the volume of the electromagnetic wave shielding wall 16 compared to the illuminating device 1 shown in FIG. 1.

It should be noted that the normal wire-grid polarizer without the wires 52a may be used in the illuminating device shown in FIG. 11. In addition, the normal wire-grid polarizer and the member having the wires 52a on a transparent substrate may be so arranged as to face each other. The wires 52a of the member are grounded.

Figure 12:
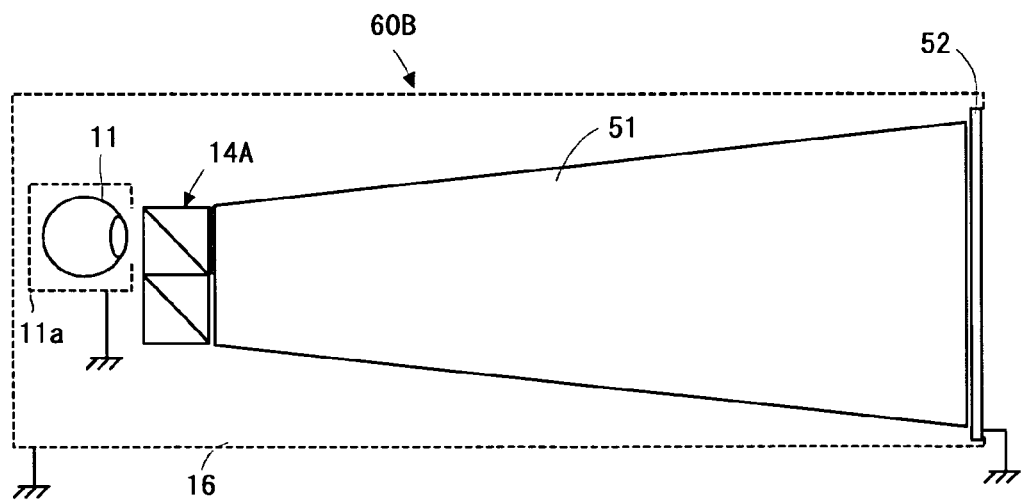
FIG. 12 is a descriptive diagram showing another configuration example of an illuminating device of the present invention.

FIG. 12 shows an illuminating device 60B with another configuration example. The illuminating device 60B is provided with the polarization conversion system 14A as the polarization conversion system and the rod integrator 51 as the optical integrator inside the electromagnetic wave shielding wall 16. The polarization conversion system 14A has a structure in which two polarizing beam splitters are aligned. The aspect ratio of the polarization conversion system 14A is equal to or approximately equal to that of the light incident surface of the rod integrator 51. In addition, the aspect ratio of the aperture for light passage of the electromagnetic wave shielding wall 16 is equal to or approximately equal to that of the light exit surface of the rod integrator 51. The wire-grid polarizer 52 is arranged on the aperture for light passage of the electromagnetic wave shielding wall 16. The wire-grid polarizer 52 is grounded.

The polarization conversion system 14A converts the polarization directions of light in the common direction. However, when the polarization directions are not converted completely in the common direction, the objects to be illuminated (liquid crystal display panels 81, 82, 83) are damaged due to heat. The illuminating device 60B is provided with the wire-grid polarizer 52, so that it is possible to prevent the damage due to heat and to shield the electromagnetic wave at the same time. A plurality of wire-grid polarizers 52 may be provided. Furthermore, same as in the configuration shown in FIG. 10, it is possible to adopt the configuration in which the wire-grid polarizers 56, 57, and the retardation plate 58 are arranged on the aperture for light passage.

In addition, in the illuminating device shown in FIG. 12, a normal wire-grid polarizer without the wires 52a can be used. Moreover, the normal wire-grid polarizer and the member having the wires 52a on a transparent substrate may be so arranged as to face each other. The wires 52a of the member are grounded.

Furthermore, these illuminating devices can be used instead of the illuminating device 1 in the projection type display apparatus shown in FIG. 1. In addition, the configuration of the projection type display apparatus is not limited to the configuration shown in FIG. 1. It is possible to adopt a configuration in which image light is generated by guiding white light emitted from such the illuminating devices to a single-panel video display panel and the image light is projected by a projection optical system. Alternately, instead of the liquid crystal display panel, a video display panel of a type in which micro mirrors are individually driven can be used, for example.

Figure 13:
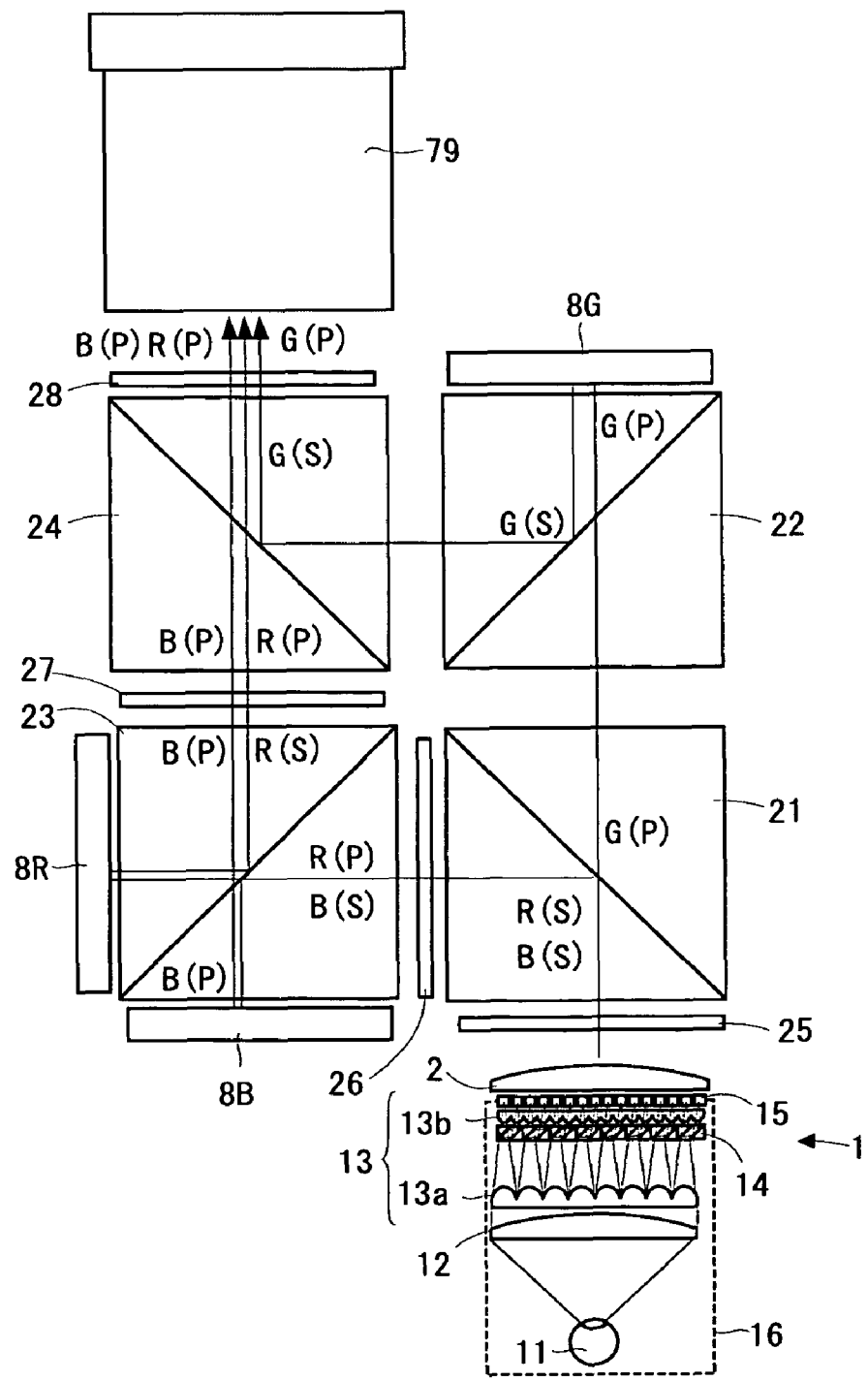
FIG. 13 is a descriptive diagram showing another optical system of a projection type display apparatus of the present invention.

FIG. 13 shows a projection type display apparatus using reflective liquid crystal display panels. The projection type display apparatus has four polarizing beam splitters arranged two-by-two. The illuminating device 1 emits a polarized light of which vibration direction is perpendicular to the paper surface (hereinafter, referred to as the S-polarized light). A wavelength selective retardation plate 25 changes only the vibration direction of the green light by 90 degrees. That is, the green light is converted into the polarized light of which vibration direction is parallel to the paper surface (hereinafter, referred to as the P-polarized light) by the retardation plate 25. The green light G (P) passes through polarizing beam splitters 21, 22 and reaches a reflective liquid crystal display panel for green light 8G. The green light G (P) is reflected by the reflective liquid crystal display panel 8G to be green image light G (S) which is the S-polarized light. The green image light G (S) is reflected by the polarizing beam splitter 22 and then reflected by a polarizing beam splitter 24, to reach a wavelength selective retardation plate 28. The retardation plate 28 changes only the vibration direction of the green light by 90 degrees. That is, the green image light G (S) is converted into the green image light G (P) by the retardation plate 28, and the green image light G (P) reaches a projection lens 79.

Red light R(S) and blue light B (S) reflected by the polarizing beam splitter 21 reach a wavelength selective retardation plate 26. The retardation plate 26 changes only the vibration direction of the red light by 90 degrees. That is, the light given out from the retardation plate 26 becomes red light R (P) and blue light B (S) to reach a polarizing beam splitter 23. The red light R (P) passes through the polarizing beam splitter 23 and reaches a reflective liquid crystal display panel for red light 8R. The red light R (P) is reflected by the reflective liquid crystal display panel 8R to be red image light R (S) which is the S-polarized light. The red image light R (S) is reflected by the polarizing beam splitter 23 and reaches a wavelength selective retardation plate 27.

The blue light B (S) is reflected by the polarizing beam splitter 23 and reaches a reflective liquid crystal display panel for blue light 8B. The blue light B (S) is reflected by the reflective liquid crystal display panel 8B to be blue image light B (P) which is the P-polarized light. The blue image light B (P) passes through the polarizing beam splitter 23 and reaches the retardation plate 27.

The retardation plate 27 changes only the vibration direction of the red light by 90 degrees. That is, the image light given out from the retardation plate 27 becomes the red image light R (P) and the blue image light B (P) to reach the polarizing beam splitter 24. Therefore, both of the red image light R (P) and the blue image light B (P) pass through the polarizing beam splitter 24 to reach the retardation plate 28. The retardation plate 28 changes only the vibration direction of the green light by 90 degrees, so that the red image light R (P) and the blue image light B (P) reach the projection lens 79 as they are the P-polarized light.

Figure 14:
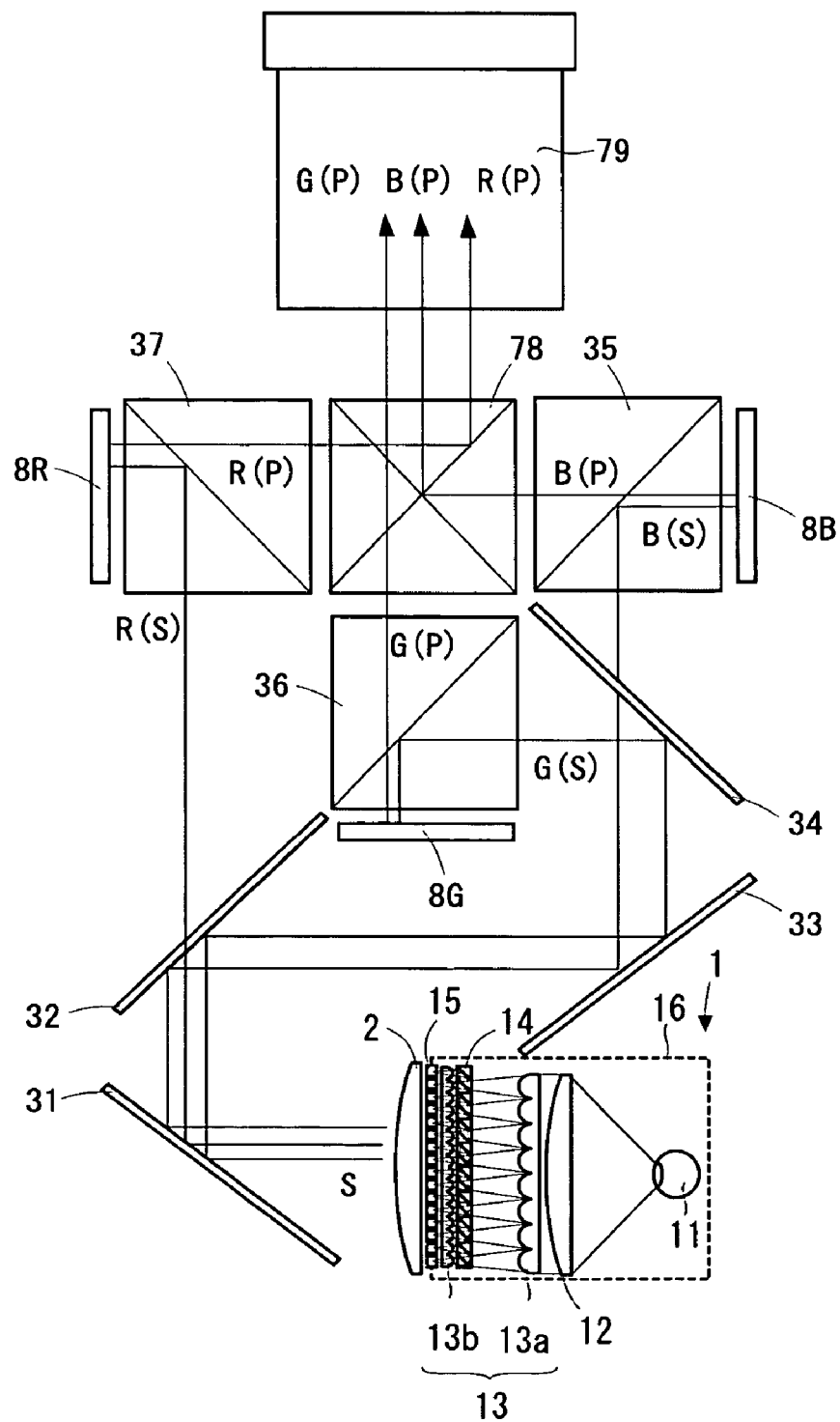
FIG. 14 is a descriptive diagram showing another optical system of a projection type display apparatus of the present invention.

FIG. 14 shows another example of the projection type display apparatus using the reflective liquid crystal display panels. The illuminating device 1 emits the S-polarized light. White light reflected by a mirror 31 is guided to a dichroic mirror 32. The dichroic mirror 32 transmits the red light R (S) and reflects the green light G (S) and the blue light B (S). The green light G (S) and the blue light B (S) are reflected by a mirror 33 and guided to a dichroic mirror 34. The dichroic mirror 34 transmits the blue light B (S) and reflects the green light G (S). The blue light B (S) is reflected by a polarizing beam splitter 35 to reach the reflective liquid crystal display panel for blue light 8B. The blue light B (S) is reflected by the reflective liquid crystal display panel 8B to be the blue image light B (P) which is the P-polarized light. The blue image light B (P) passes through the polarizing beam splitter 35 to reach a cross dichroic prism 78.

The green light G (S) is reflected by a polarizing beam splitter 36 to reach the reflective liquid crystal display panel for green light 8G. The green light G (S) is reflected by the reflective liquid crystal display panel 8G to be the green image light G (P) which is the P-polarized light. The green image light G (P) passes through a polarizing beam splitter 36 to reach the cross dichroic prism 78.

The red light R (S) is reflected by a polarizing beam splitter 37 to reach the reflective liquid crystal display panel for red light 8R. The red light R (S) is reflected by the reflective liquid crystal display panel 8R to be the red image light R (P) which is the P-polarized light. The red image light R (P) passes through the polarizing beam splitter 37 to reach the cross dichroic prism 78.

The red image light R (P), the green image light G (P), and the blue image light B (P) are combined by the cross dichroic prism 78 to be guided to the projection lens 79.

In the projection type display apparatuses shown in FIGS. 13, 14, other illuminating devices described above can be used instead of the illuminating device 1.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An illuminating device comprising:
   an electrodeless discharge lamp which generates an electromagnetic wave;
   an optical integrator, comprising a light-incident-side fly's eye lens and a light-exit-side fly's eye lens, for integrating light emitted from the discharge lamp and approximately collimated to guide the light to an object to be illuminated;
   a polarization conversion system, comprising a polarizing beam splitter array, for converting polarization directions of the light emitted from the discharge lamp in a common direction; and
   a plate-like conductive body including a plurality of apertures; wherein
   a lens arrangement pitch of the light-exit-side fly's eye lens is half of a lens arrangement pitch of the light-incident-side fly's eye lens;
   the light passing through each lens in the light-incident-side fly's eye lens is separated into two via the polarizing beam splitter array to pass through two lenses in the light-exit-side fly's eye lens and the apertures of the plate-like conductive body; and
   the plate-like conductive body is grounded, wherein
   the light-incident-side fly's eye lens has a convex lens side positioned on the light incident side thereof, and is provided with a third conductive body in a non-light-passing area on a flat surface side which is a light exit side; and
   the third conductive body is grounded and in contact with the flat surface side of the light-incident-side fly's eye lens.

2. A projection type video display apparatus comprising one or a plurality of light valves for modulating light emitted from an illuminating device, wherein the projection type display apparatus comprises an illuminating device according to claim 1 as the illuminating device.

\* \* \* \* \*